United States Patent
Ugurlu et al.

(10) Patent No.: US 10,944,501 B2
(45) Date of Patent: Mar. 9, 2021

(54) METHOD AND APPARATUS FOR DETERMINING MODULATION AND CODING SCHEME TABLE IN MOBILE COMMUNICATIONS

(71) Applicant: MediaTek Singapore Pte. Ltd., Singapore (SG)

(72) Inventors: Ahmet Umut Ugurlu, Cambridge (GB); Abdellatif Salah, Cambridge (GB); Abdelkader Medles, Cambridge (GB); Madanahally Ramakrishna Raghavendra, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 12 days.

(21) Appl. No.: 16/219,853

(22) Filed: Dec. 13, 2018

(65) Prior Publication Data

US 2019/0190644 A1 Jun. 20, 2019

Related U.S. Application Data

(60) Provisional application No. 62/599,078, filed on Dec. 15, 2017.

(51) Int. Cl.
*H04L 12/801* (2013.01)
*H04L 12/24* (2006.01)
(Continued)

(52) U.S. Cl.
CPC .......... *H04L 1/0003* (2013.01); *H04L 1/0016* (2013.01); *H04L 27/2607* (2013.01);
(Continued)

(58) Field of Classification Search
CPC ... H04L 1/003; H04L 1/0016; H04L 27/2607; H04L 1/0017; H04L 1/0025; H04W 72/0446; H04W 72/042; H04W 76/11
See application file for complete search history.

(56) References Cited

U.S. PATENT DOCUMENTS

2010/0290559 A1* 11/2010 Futagi ................... H04L 1/0021
375/295
2012/0076068 A1 3/2012 Zhao et al.
(Continued)

FOREIGN PATENT DOCUMENTS

CN 102595600 A 7/2012
CN 103648169 A 3/2014
(Continued)

OTHER PUBLICATIONS

State Intellectual Property Office of China, International Search Report and Written Opinion for International Patent Application No. PCT/CN2018/121181, dated Jan. 31, 2019.
(Continued)

*Primary Examiner* — Faruk Hamza
*Assistant Examiner* — Abusayeed M Haque
(74) *Attorney, Agent, or Firm* — Han IP PLLC; Andy M. Han

(57) ABSTRACT

Various solutions for determining a modulation and coding scheme (MCS) table with respect to user equipment and network apparatus in mobile communications are described. An apparatus may receive an indication from a network node. The apparatus may determine an MCS table from a plurality of MCS tables for a high-reliability service according to the indication. The apparatus may use the MCS table in a channel for the high-reliability service.

16 Claims, 5 Drawing Sheets

(51) Int. Cl.
*H04L 29/06* (2006.01)
*H04L 1/00* (2006.01)
*H04W 76/11* (2018.01)
*H04W 76/27* (2018.01)
*H04L 27/26* (2006.01)
*H04W 72/04* (2009.01)
*H04L 5/00* (2006.01)

(52) U.S. Cl.
CPC ..... *H04W 72/042* (2013.01); *H04W 72/0446* (2013.01); *H04W 76/11* (2018.02); *H04W 76/27* (2018.02); *H04L 5/0007* (2013.01)

(56) References Cited

U.S. PATENT DOCUMENTS

| | | |
|---|---|---|
| 2015/0245326 A1 | 8/2015 | Rune et al. |
| 2015/0312071 A1 | 10/2015 | Chen et al. |
| 2015/0358111 A1* | 12/2015 | Marinier ............ H04L 27/0008 370/329 |
| 2015/0381310 A1* | 12/2015 | Hammarwall ...... H04W 72/082 370/329 |
| 2016/0205564 A1* | 7/2016 | Ren ....................... H04L 27/362 370/252 |
| 2016/0226623 A1* | 8/2016 | Froberg Olsson ... H04B 7/0632 |
| 2016/0337150 A1* | 11/2016 | Larsson ................ H04L 1/0026 |
| 2017/0290046 A1* | 10/2017 | Sun ................. H04W 72/082 |
| 2018/0041858 A1* | 2/2018 | Sheng ................ H04L 1/0064 |
| 2018/0124648 A1* | 5/2018 | Park ................. H04W 36/0072 |
| 2019/0036640 A1* | 1/2019 | Xu ........................ H04L 1/0009 |
| 2019/0075492 A1* | 3/2019 | Suzuki ................ H04L 1/0003 |
| 2019/0165894 A1* | 5/2019 | Choi .................... H04L 5/0055 |
| 2019/0280802 A1* | 9/2019 | Ma ....................... H04W 76/11 |

FOREIGN PATENT DOCUMENTS

| | | |
|---|---|---|
| CN | 103944855 A | 7/2014 |
| EP | 3122141 A1 | 1/2017 |

OTHER PUBLICATIONS

Taiwan Intellectual Property Office, Office Action for Taiwan Patent Application No. 107145162, dated Sep. 25, 2019.

\* cited by examiner

100

| MCS Index $I_{MCS}$ | Modulation Order $Q_m$ | Target code Rate $R$ x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

FIG. 1

METHOD AND APPARATUS FOR DETERMINING MODULATION AND CODING SCHEME TABLE IN MOBILE COMMUNICATIONS

CROSS REFERENCE TO RELATED PATENT APPLICATION(S)

The present disclosure is part of a non-provisional application claiming the priority benefit of U.S. Patent Application No. 62/599,078, filed on 15 Dec. 2017, the content of which is incorporated by reference in its entirety.

TECHNICAL FIELD

The present disclosure is generally related to mobile communications and, more particularly, to modulation and coding scheme (MCS) table determination with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. It can be expected to have a diverse range of URLLC services in the future, each targeting a different use case. Hence, supporting different URLLC block error rate (BLER) targets are considered in NR for future compatibility.

In Long-Term Evolution (LTE), channel quality indicator (CQI) report is derived based on a single BLER target for data (e.g., 10% BLER). In NR, it has been proposed that two target BLER values will be supported for URLLC to achieve the critical reliability requirements. There can be two separate CQI tables associated with two or more different target BLER (e.g., $10^{-3}$ and $10^{-5}$ for URLLC). Alternatively, different subsets of a single CQI table can also be configured/activated depending on the target BLER.

In LTE, a single MCS table is used to inform the UE about coding rate and modulation order that corresponds to the entries in the single CQI table. In NR, it is important to develop CQI tables covering very low code rates for particular BLER targets. It is also essential to construct the MCS table in reference to the entries in the CQI tables. Particularly for URLLC, it is essential to have an MCS table with sufficiently low coding rate entries whereas enhanced mobile broadband (eMBB) in NR may require higher coding rates.

It is expected to have more diverse URLLC services with different BLER targets (i.e., varying reliability requirements) in comparison to eMBB services. In case different CQI tables are configured for each service, different MCS tables may be needed for each URLLC service. Accordingly, how to configure/signal a service-specific MCS table among different MCS tables may become a new issue in the newly developed communication system. It is needed to provide proper mechanisms to indicate a selected MCS table for the UE to use in a communication channel.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to MCS table determination with respect to user equipment and network apparatus in mobile communications.

In one aspect, a method may involve an apparatus receiving an indication from a network node. The method may also involve the apparatus determining an MCS table from a plurality of MCS tables for a high-reliability service according to the indication. The method may further involve the apparatus using the MCS table in a channel for the high-reliability service.

In one aspect, an apparatus may comprise a transceiver capable of wirelessly communicating with a plurality of nodes of a wireless network. The apparatus may also comprise a processor communicatively coupled to the transceiver. The processor may be capable of receiving, via the transceiver, an indication from a network node. The processor may also be capable of determining an MCS table from a plurality of MCS tables for a high-reliability service according to the indication. The processor may further be capable of using the MCS table in a channel for the high-reliability service.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram depicting an example MCS table under schemes in accordance with implementations of the present disclosure.

DETAILED DESCRIPTION OF PREFERRED IMPLEMENTATIONS

Figure 2:
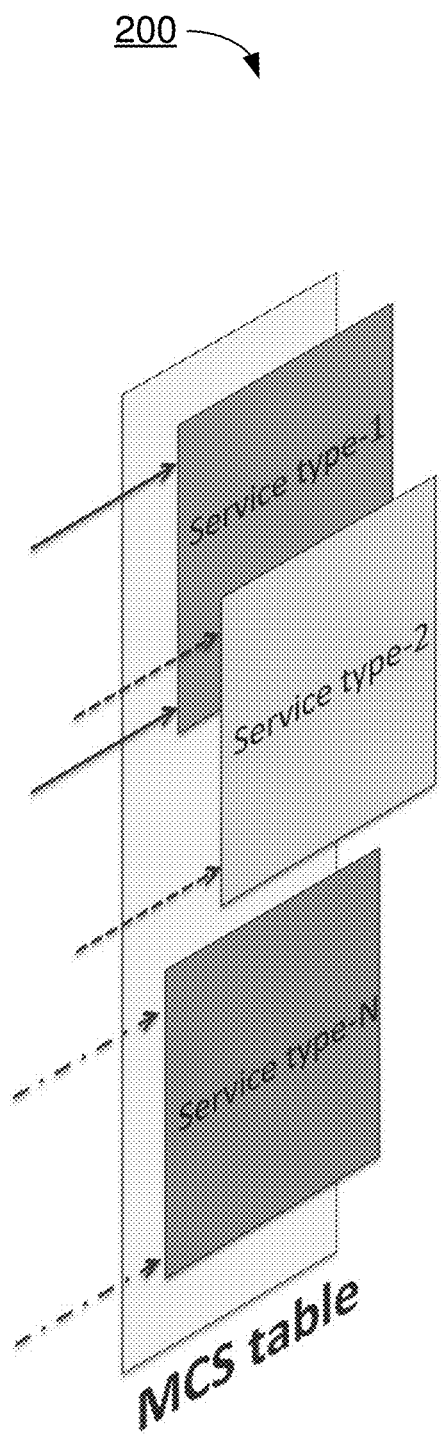
FIG. 2 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to MCS table determination with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. It can be expected to have a diverse range of URLLC services in the future, each targeting a different use case. Hence, supporting different URLLC BLER targets are considered in NR for future compatibility.

In LTE, channel quality indicator (CQI) report is derived based on a single BLER target for data (e.g., 10% BLER). In NR, it has been proposed that two target BLER values will be supported for URLLC to achieve the critical reliability requirements. There can be two separate CQI tables associated with two or more different target BLER (e.g., $10^{-3}$ and $10^{-5}$ for URLLC). Alternatively, different subsets of a single CQI table can also be configured/activated depending on the target BLER.

In LTE, a single MCS table is used to inform the UE about coding rate and modulation order that corresponds to the entries in the single CQI table. In NR, it is important to develop CQI tables covering very low code rates for particular BLER targets. It is also essential to construct the MCS table in reference to the entries in the CQI tables. Particularly for URLLC, it is essential to have an MCS table with sufficiently low coding rate entries whereas enhanced mobile broadband (eMBB) in NR may require higher coding rates. Therefore, a similar problem may arise due to a need for a large number of entries in the MCS table.

It is expected to have more diverse URLLC services with different BLER targets (i.e., varying reliability requirements) in comparison to eMBB services. In case different CQI tables are configured for each service, different MCS tables may be needed for each URLLC service. However, how to configure/signal a service-specific MCS table among different MCS tables has not been discussed yet.

In view of the above, the present disclosure proposes a number of schemes pertaining to determining the MCS table with respect to the UE and configuring/signaling the MCS table with respect to the network apparatus. According to the schemes of the present disclosure, multiple MCS tables for URLLC that correspond to the CQI tables associated with different URLLC BLER targets may be defined. As the UE may require the selected MCS values during demodulation or modulation, the schemes may involve configuring/signaling and determining the selected MCS table as well as the MCS entry index within the selected MCS table.

FIG. 1 illustrates an example MCS table 100 under schemes in accordance with implementations of the present disclosure. MCS table 100 may comprise a plurality of entries (e.g., 32 rows). Each entry may comprise a MCS index $I_{MCS}$ (e.g., from 0 to 31). Each MCS index may correspond to a plurality of MCS values such as a modulation order $Q_m$, a target code rate and a spectral efficiency. The UE may be configured to use the appropriate MCS values for demodulating a downlink channel or modulating an uplink channel. For example, MCS table 100 may comprise fields with low code rate (e.g., target code rate 30, 40, 50, etc.). The low code rate may be used in performing high-reliability services. The high-reliability services may comprise the URLLC, the uplink grant-free service, or the downlink semi-persistent scheduling (SPS) service. The channel (e.g., downlink channel or uplink channel) may comprise a physical downlink shared channel (PDSCH), a cyclic prefix-orthogonal frequency division multiplexing (CP-OFDM) physical uplink shared channel (PUSCH), or a discrete Fourier transform-spread OFDM (DFT-S-OFDM) PUSCH.

As mentioned above, multiple MCS tables may be defined for different services (e.g., eMBB or URLLC). Each MCS table may further comprise a plurality of entries. In order to apply correct MCS values, the network apparatus may need to properly inform the UE which MCS table and MCS index are used in performing a specific service or a specific channel. The network apparatus may be configured to inform the UE by some indications. The indications may comprise a higher layer indication, a physical layer indication or a combination thereof. After receiving the indication, the UE may be configured to determine an MCS table according to the indication. Different MCS tables may be used in performing different services (e.g., eMBB or URLLC). The UE may also receive the DCI from the network apparatus. The UE may be configured to determine an MCS index (e.g., $I_{MCS}$) according to the DCI. The UE may further be configured to determine the MCS values according to the MCS table and the MCS index.

In some implementations, the network apparatus may use the higher-layer indication to indicate the selected MCS table. The higher-layer indication may comprise a radio resource control (RRC) parameter. Specifically, multiple MCS tables may be pre-specified for eMBB services or URLLC services. The UE may store the multiple MCS tables in its memory. The network apparatus may be configured to use the RRC parameter to indicate one of those MCS tables. For example, the UE may store or may be configured a first MCS table (e.g., "qam64" MCS table), a second MCS table (e.g., "qam256" MCS table) and a third MCS table (e.g., "qam64LowSE" MCS table). The RRC parameter which may be used to indicate the UE may comprise, for example and without limitations, a ConfiguredGrantConfig IE, a PDSCH-Config IE, a PUSCH-Config IE, or a SPS-Config IE. The RRC parameter may carry layer 1 (L1) parameter such as, for example and without limitations, a mcs-Table or a mcs-TableTransformPrecoder to indicate the selected MCS table. The L1 parameter may indicate "qam64" for the first MCS table, "qam256" for the second MCS table and "qam64LowSE" for the third MCS table.

The third MCS table may comprise fields with low code rate for use in performing high-reliability services (e.g., URLLC). The UE may be configured to receive the RRC parameter from the network apparatus. The RRC parameter may carry the L1 parameter indicating "qam64LowSE". The UE may be able to determine that the selected MCS table is the third MCS table according to the RRC parameter. The UE may be configured to use the third MCS table for a downlink channel (e.g., PDSCH) or an up link channel (e.g., PUSCH).

In some implementations, the network apparatus may use the physical layer indication to indicate the selected MCS table. The physical layer indication may comprise a radio network temporary identifier (RNTI). Specifically, a specific RNTI may be defined for the URLLC. The specific RNTI may comprise, for example and without limitations, a MCS-C-RNTI for indicating the use of "qam64LowSE" MCS table. The network apparatus may use the specific RNTI to scramble the cyclic redundancy check (CRC) of the downlink control information (DCI) for configuring the corresponding MCS table. The UE may be configured to receive the DCI in a control channel (e.g., physical downlink control channel (PDCCH)). When the UE receives the DCI scrambled with the specific RNTI, the UE may be configured to determine the selected MCS table according to the DCI. For example, the UE may determine that the selected MCS table is the third MCS table in a case that the DCI is scrambled with the MCS-C-RNTI. Accordingly, when the DCI format for scheduling is scrambled with the specific RNTI for URLLC, the UE may be able to implicitly recognize the associated service type of the scheduling DCI based on which RNTI can successfully decoded it.

In a case that the specific RNTI (e.g., MCS-C-RNTI) is not configured, the RRC parameter field mcs-Table or mcs-TableTransformPrecoder may be used to determine the MCS table. Accordingly, a mix of the RRC parameter and the RNTI may also be used to determine the MCS table. In a case that MCS-C-RNTI is not configured, the higher-layer parameter mcs-Table or mcs-TableTransformPrecoder may be used to determine the MCS table. In a case that MCS-C-RNTI is configured and the PDSCH is scheduled by a PDCCH with CRC scrambled by MCS-C-RNTI, the UE may be configured to use the third MCS table (e.g., "qam64LowSE" MCS table) for a downlink channel (e.g., PDSCH) or an up link channel (e.g., PUSCH).

In some implementations, the network apparatus may use the physical layer indication to indicate the selected MCS table. The physical layer indication may comprise a type of search space. Specifically, the UE may be configured with multiple search spaces for different PDCCH candidates. The types of the search space for PDCCH monitoring may comprise a common search and a UE-specific search space. In a case that the scheduling DCI for URLLC and eMBB are positioned in different search spaces, the UE may be able to identify the correct DCI for each corresponding service type according to the type of the search space. For example, in a case that the DCI formats 0_0/1_0 in the common search space are detected, the UE may determine that the first MCS table (e.g., "qam64" MCS table) is indicated. The first MCS table may be used for the eMBB service. In a case that the DCI formats 0_0/1_0/0_1/1_1 in the UE-specific search space are detected, the UE may determine that the third MCS table (e.g., "qam64LowSE" MCS table) is indicated. The third MCS table may be used for the URLLC service.

The search space configuration of service type recognition of DCI may be implemented in different ways. One way is to restrict the search space by specification definition. The DCI for URLLC may be restricted to certain aggregation levels or to certain control channel elements (CCEs). Alternatively, the DCI for URLLC may be restricted to certain OFDM symbol numbers. For example, the DCI for URLLC may be always configured at the earlier OFDM symbol than the DCI for eMBB. Another way is to restrict the search space by RRC signaling. The configurable service type may be signaled by scheduling DCI in a certain PDCCH search space. For example, this may be signaled in the same RRC message configuring the UE-specific PDCCH search spaces.

A mix of the RRC parameter and the type of the search space may also be used to determine the MCS table. In a case that MCS-C-RNTI is not configured, when the higher-layer parameter mcs-Table or mcs-TableTransformPrecoder indicates the third MCS table (e.g., "qam64LowSE" MCS table), the UE may be configured to determine the MCS table based on whether the scheduling PDCCH is detected in the UE-specific search space or not. In a case that MCS-C-RNTI is configured, the UE may be configured to use the third MCS table (e.g., "qam64LowSE" MCS table) independently of the search space configuration.

In some implementations, the network apparatus may use the physical layer indication to indicate the selected MCS table. The physical layer indication may comprise a DCI format. Specifically, a different or specific DCI format may be defined for the scheduling DCI for URLLC. Thus, the corresponding service type may be easily identified from the DCI. Although this option may come at the cost of increased UE blind decode attempts, the additional benefit with this option may be the opportunity so specify a compact-sized DCI for URLLC with a small payload size.

RRC Configuration of MCS Table

In some implementations, multiple MCS table candidates for URLLC may be pre-specified. One table from the multiple pre-specified MCS tables may be semi-statistically configured to the UE by the RRC signaling. The UE may be configured to select the MCS index from the configured MCS table according to the DCI scheduling PDSCH/PUSCH. Alternatively, a subrange of a single pre-specified MCS table may be indicated (e.g., by indicating the first or last entry indices).

FIG. 2 illustrates an example scenario 200 under schemes in accordance with implementations of the present disclosure. Scenario 200 illustrates a single extended MCS table. The network apparatus may indicate one specific subrange of entries from the table via RRC signaling. The UE may be configured with one compact MCS table. For example, service type-1 . . . service type-N may correspond to both eMBB and URLLC services with different requirements. Alternatively, service type-1 . . . service type-N may correspond to different ULRRC service with different reliability requirements. The network apparatus may use the RRC signalling to configure a range of table indices {k_start, k_end} (e.g., 1≤k_start≤k_end≤M). M may represent the maximum entry index in the MCS table. Alternatively, the ranges may be pre-defined to the UE. The network apparatus may configure an index corresponding to one of the pre-defined ranges via the RRC signalling. For example, the network apparatus may configure an indication of index k_rangeID (e.g., 1≤k_rangeID≤L). L may represent the maximum pre-defined range index.

Figure 3:
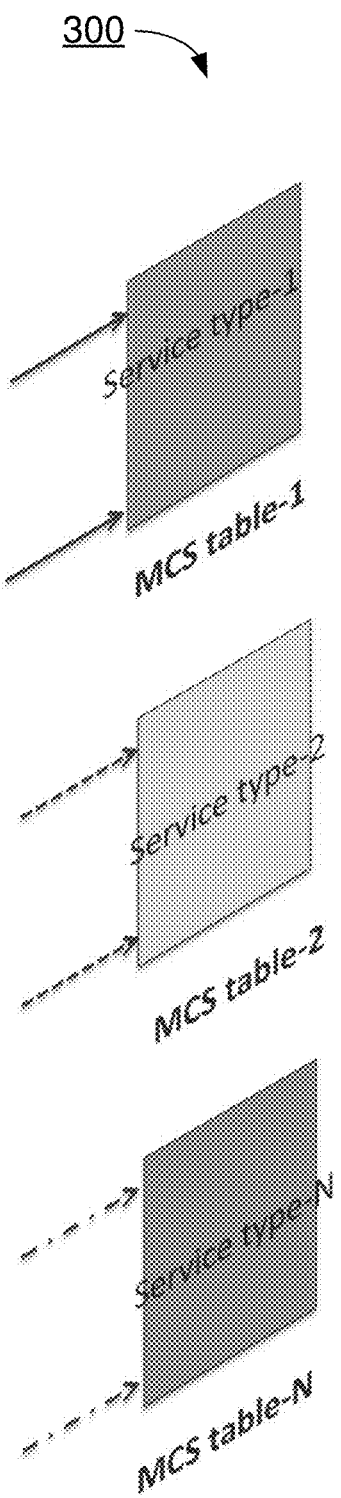
FIG. 3 is a diagram depicting an example scenario under schemes in accordance with implementations of the present disclosure.

FIG. 3 illustrates an example scenario 300 under schemes in accordance with implementations of the present disclosure. Scenario 300 illustrates separate MCS tables for each of service type-1 . . . service type-N. In such scenario, the network apparatus may use the RRC signalling to configure an MCS table index k (e.g., 1≤k≤N). N may represent the total number of available tables.

In some implementations, the network apparatus may configure the UE by RRC signalling with a service-specific MCS table for URLLC. The network apparatus may transmit a DCI scheduling PDSCH or PUSCH for URLLC dynamically. In case of PUSCH, the scheduling may also be based on non-dynamic pre-configuration (e.g., SPS with DCI activation). The DCI contents may comprise resource assignments as well as MCS indices for each codeword. The UE may be configured to derive the MCS values from the configured MCS table by RRC signalling.

In some implementations, the network apparatus may configure the UE by RRC signalling with two separate MCS tables for URLLC and eMBB. The network apparatus may transmit two separate DCI scheduling PDSCH/PUSCH for eMBB and URLLC dynamically. The assigned resources may or may not be overlapped. In case of PUSCH, the scheduling may also be based on non-dynamic pre-configuration (e.g., SPS with DCI activation). The UE may be configured to distinguish these DCI based on different RNTI, search space or different DCI format/size. The DCI contents may comprise resource assignments as well as MCS indices for each codeword. The UE may be configured to derive the corresponding MCS values for both eMBB and URLLC based on the previously configured MCS tables.

In some implementations, the network apparatus may configure the UE by RRC signalling with a single MCS table for both URLLC and eMBB. The network apparatus may transmit one DCI scheduling PDSCH/PUSCH for eMBB and URLLC dynamically on the same physical link. The DCI contents may comprise resource assignments as well as different MCS indices for each codeword. Each codeword may correspond to either eMBB or URLLC data. The UE may be configured to determine the MCS values for each of these codewords based on the previously configured MCS table by RRC signalling.

RRC+DCI Configuration of MCS Table

In some implementations, multiple MCS table candidates for URLLC may be specified and a group of those tables may be semi-statistically configured to the UE by RRC signalling. The DCI scheduling PDSCH/PUSCH may be used to dynamically indicate UE with one of those selected tables as well as an MCS index from that table. The MCS indices indicated via the DCI scheduling PDSCH/PUSCH may correspond to different MCS tables for each codeword according to the configured MCS tables in the DCI. This configuration may provide better MCS granularity than the RRC-only option as the UE may be configured with multiple MCS tables at a time either by the same DCI or by different DCI. Multiple separate MCS tables may be configured by RRC signalling. Two or more tables from multiple pre-specified MCS tables may be indicated. Alternatively, a set of sub-tables from a single pre-specified MCS table may be indicated (e.g., by indicating the first and last entry indices of each sub-table). As a small set of MCS tables are configured by RRC signalling, the additional field in the DCI to indicate a specific MCS table may not require too many bits in the scheduling grant. Since the UE is configured by the scheduling DCI one MCS table per codeword, the UE may not need to recognize which service corresponds to which resource grant at the physical level. This option may have better flexibility as more than one MCS table can be configured by RRC signalling at any time. This option may also have better granularity for MCS entry selection in case of multiple simultaneous services (e.g., in case of two simultaneous URLLC services with different reliability requirements).

In some implementations, as illustrated in FIG. 2, the network apparatus may indicate multiple subrange of entries from the table via RRC signaling. The UE may be configured with a set of compact MCS tables. The network apparatus may further use an additional field in DCI to configure each codeword with one of those MCS tables. For example, service type-1 . . . service type-N may correspond to both eMBB and URLLC services with different requirements. Alternatively, service type-1 . . . service type-N may correspond to different ULRRC service with different reliability requirements. The network apparatus may use the RRC signalling to configure multiple ranges of table indices {k1_start, k1_end}, {k2_start, k2_end}, etc. (e.g., 1≤k1_start k1_end≤M, 1≤k2_start≤k2_end≤M, etc.). M may represent the maximum entry index in the MCS table. The network apparatus may use the DCI to configure one of the RRC configured MCS sub-tables by indicating the corresponding bits (e.g., '00' to configure {k1_start, k1_end}). Alternatively, the ranges may be predefined to the UE. The network apparatus may use the RRC signalling to configure an index corresponding to one of the predefined ranges. For example, the network apparatus may configure an indication of index k_rangeID, (e.g., 1≤k_rangeID≤L). L may represent the maximum predefined range index. The network apparatus may use the DCI to configure one of the RRC configured MCS sub-tables by indicating the corresponding bits (e.g., '00' to configure {k1_start, k1_end}).

In some implementations, as illustrated in FIG. 3, the network apparatus may indicate separate MCS tables for each of service type-1 . . . service type-N. In such scenario, the network apparatus may use the RRC signalling to configure a set of MCS table indices k1, k2, etc. (e.g., 1≤k1, k2 . . . ≤N). N may represent the total number of available tables. The network apparatus may use the DCI to configure one of the RRC configured MCS tables by indicating the corresponding bits (e.g., '00' to configure k1).

In some implementations, the network apparatus may configure the UE by RRC signalling with a set of service-specific MCS tables for URLLC. The network apparatus may transmit a DCI scheduling PDSCH or PUSCH for URLLC dynamically. In case of PUSCH, the scheduling may also be based on non-dynamic pre-configuration (e.g., SPS with DCI activation). The DCI contents may comprise resource assignments as well as an MCS table index and an entry index for each codeword. The UE may be configured to derive the MCS values according to the configured MCS table by the DCI and the RRC signalling for each codeword.

In some implementations, the network apparatus may configure the UE by RRC signalling with one MCS table for eMBB and multiple MCS tables for URLLC. The network apparatus may transmit two separate DCI scheduling PDSCH/PUSCH for eMBB and URLLC dynamically. The assigned resources may or may not be overlapped. In case of PUSCH, the scheduling may also be based on non-dynamic pre-configuration (e.g., SPS with DCI activation). The DCI contents may comprise resource assignments as well as an MCS table index and an entry index for each codeword. The MCS table index field for the DCI scheduling for eMBB may correspond to a dummy value. The UE may be configured to distinguish these DCI based on the MCS table indices. Therefore, there may be no need for different RNTI, different search space, or different DCI format/size, etc. The UE may be configured to derive the corresponding MCS values for both eMBB and URLLC based on the previously configured MCS tables (e.g., RRC configuration for eMBB and RRC+DCI configuration for URLLC)

In some implementations, the network apparatus may configure the UE by RRC signalling with a single MCS table for eMBB and multiple MCS tables for URLLC. The network apparatus may transmit one DCI scheduling PDSCH/PUSCH for eMBB and URLLC dynamically on the same physical link. The DCI contents may comprise resource assignments as well as different MCS indices for each codeword. Each codeword may correspond to either eMBB or URLLC data. The MCS table index field for the codeword corresponding to eMBB may be a dummy value or a dedicated index value as previously configured by RRC. If a dedicated MCS table index is configured in the DCI for the eMBB codeword, such table index may override the previously configured index by the RRC signalling. The UE may be configured to determine the MCS values for each of these codewords according to the configured MCS table by the DCI and RRC signalling for each codeword (e.g., RRC (or DCI override) configuration for eMBB and RRC+DCI configuration for URLLC).

DCI-Only Configuration of MCS Table

In some implementations, multiple MCS table candidates for URLLC may be specified and one of those tables are dynamically configured to the UE by the DCI. The DCI scheduling PDSCH/PUSCH may be used to indicate the UE with one of the available tables as well as an MCS entry index from that table. The MCS entry indices indicated via the DCI scheduling PDSCH/PUSCH may correspond to different MCS tables for each codeword depending on the configured MCS table fields in the same DCI. This configuration may provide better MCS granularity than the RRC+DCI option as the UE may be configured with any of the available MCS tables dynamically per each transmission time interval (TTI). One or two indices may be included in each scheduling DCI depending on the number of codewords. Alternatively, one or two sub-tables from a single extended MCS table may be included in each scheduling DCI (e.g., by indicating the first and last entry indices for each sub-table). As there is no RRC signalling involvement, the MCS table configuration for URLLC may be dynamic and fast. Since the UE may be configured by the scheduling DCI one MCS table per codeword, the UE may not need to recognize which service corresponds to which resource grant at the physical level. This option may have good flexibility as different MCS tables may be configured per codeword dynamically per each TTI. This option may also have good granularity for MCS entry selection in case of multiple simultaneous services (e.g., in case of two simultaneous URLLC services with different reliability requirements).

In some implementations, as illustrated in FIG. 2, the network apparatus may indicate two subrange of entries from the table via scheduling DCI along with the MCS entry indices for URLLC. For example, service type-1 . . . service type-N may correspond to both eMBB and URLLC services with different requirements. Alternatively, service type-1 . . . service type-N may correspond to different ULRRC service with different reliability requirements. The network apparatus may use the DCI to configure to two subrange of table indices {k1_start, k1_end} and {k2_start, k2_end} (e.g., 1≤k1_start≤k1_end≤M, 1≤k2_start≤k2_end≤M). M may represent the maximum entry index in the MCS table.

In some implementations, as illustrated in FIG. 3, the network apparatus may indicate separate MCS tables for each of service type-1 . . . service type-N. In such scenario, the network apparatus may use the RRC signalling to configure a set of MCS table indices k1, k2, etc. (e.g., 1≤k1, k2 . . . ≤N). N may represent the total number of available tables. The network apparatus may use the DCI to configure two MCS table indices k1 and k2 (e.g., 1≤k1, k2≤N). N may represent the total number of available tables.

In some implementations, the network apparatus may transmit a DCI scheduling PDSCH or PUSCH for URLLC dynamically. In case of PUSCH, the scheduling may also be based on non-dynamic pre-configuration (e.g., SPS with DCI activation). The DCI content may comprise resource assignments as well as two MCS table indices and the MCS entry indices (e.g., one per codeword). The UE may be configured to derive the MCS values based on the signalled MCS table index and entry index both by the DCI.

In some implementations, the network apparatus may configure the UE by RRC signalling with one MCS table for eMBB only. The network apparatus may transmit two separate DCI scheduling PDSCH/PUSCH for eMBB and URLLC dynamically. The assigned resources may or may not be overlapped. In case of PUSCH, the scheduling may also be based on non-dynamic pre-configuration (e.g., SPS with DCI activation). The DCI contents may comprise resource assignments as well as an MCS table index and an entry index for each codeword. The MCS table index field for the DCI scheduling for eMBB may correspond to a dummy value whereas the MCS table index field for the DCI scheduling for URLLC may indicate the table configuration. The UE may be configured to distinguish these DCI based on the MCS table index fields. Therefore, there may be no need for different RNTI, different search space, or different DCI format/size, etc. The UE may be configured to derive the corresponding MCS values for both eMBB and URLLC based on the previously configured MCS tables (e.g., RRC configuration for eMBB and RRC+DCI configuration for URLLC).

In some implementations, the network apparatus may configure the UE by RRC signalling with a single MCS table for eMBB only. The network apparatus may transmit one DCI scheduling PDSCH/PUSCH for eMBB and URLLC dynamically on the same physical link. The DCI contents may comprise resource assignments as well as a different MCS table index and an entry indices for each codeword. Each codeword may correspond to either eMBB or URLLC data. The MCS table index for the codeword corresponding to eMBB may be a dummy value or a dedicated index value as previously configured by the RRC signalling. If a dedicated MCS table index is configured in the DCI for the eMBB codeword, such table index may override the previously configured index by the RRC signalling. The UE may be configured to determine the MCS values for each of these codewords according to the configured MCS tables by the DCI and the RRC signalling for each codeword (e.g., RRC (or DCI override) configuration for eMBB and RRC+DCI configuration for URLLC).

one or some of the channel recovery mechanisms as described above.

Illustrative Implementations

Figure 4:
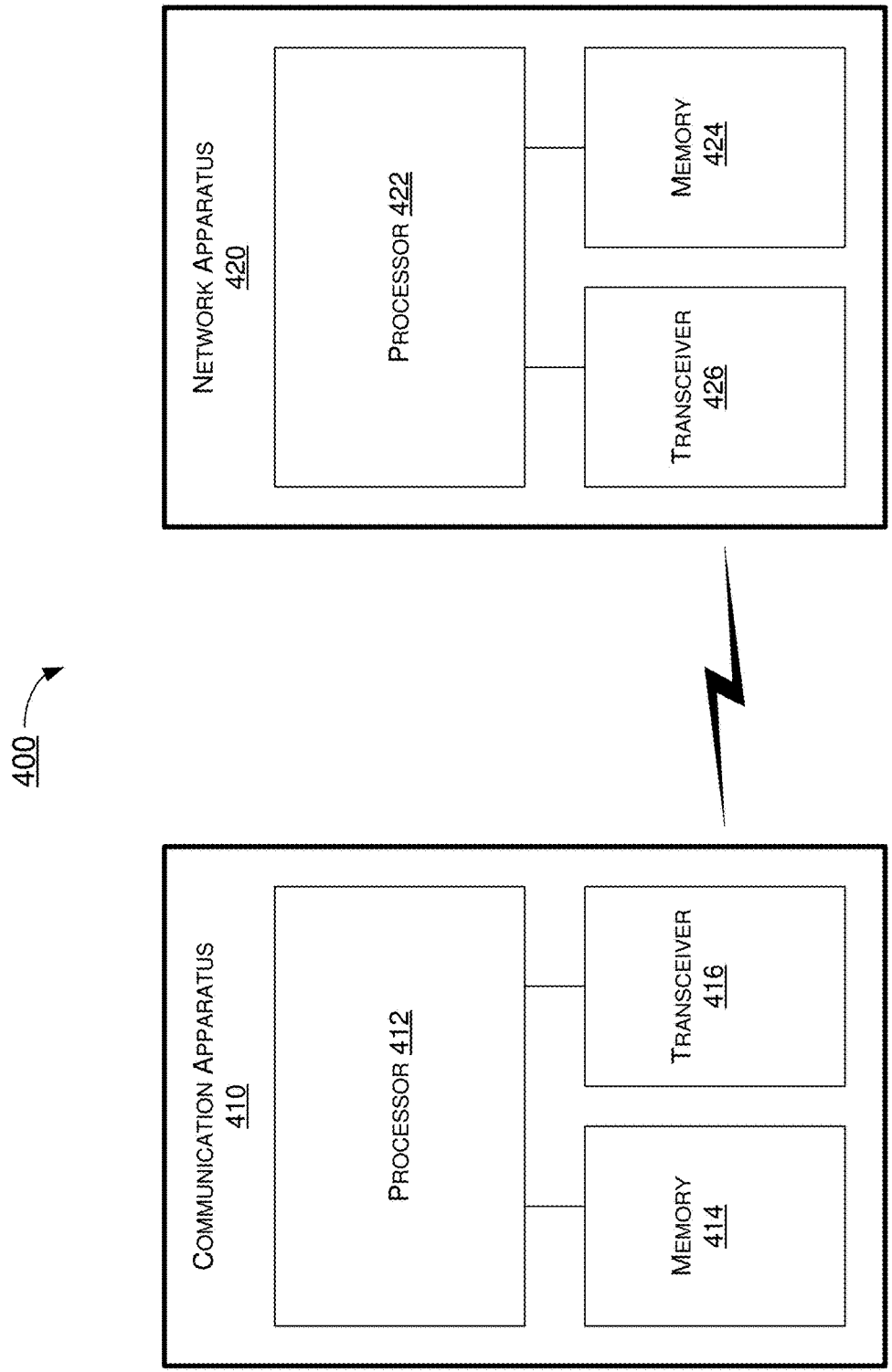
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to MCS table determination with respect to user equipment and network apparatus in wireless communications, including scenarios 200 and 300 described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, network apparatus 420 may need to properly inform communication apparatus 410 which MCS table and MCS index are used in performing a specific service or a specific channel. Processor 422 may be configured to inform, via transceiver 426, processor 412 by some indications. The indications may comprise a higher-layer indication, a physical layer indication or a combination thereof. After receiving the indication, processor 412 may be configured to determine an MCS table according to the indication. Different MCS tables may be used for different services (e.g., eMBB or URLLC). Processor 412 may also receive, via transceiver 416, the DCI from network apparatus 420. Processor 412 may be configured to determine an MCS index (e.g., $I_{MCS}$) according to the DCI. Processor 412 may further be configured to determine the MCS values according to the MCS table and the MCS index.

In some implementations, processor 422 may use the higher-layer indication to indicate the selected MCS table to communication apparatus 410. The higher-layer indication may comprise a RRC parameter. Specifically, multiple MCS tables may be pre-specified for eMBB services or URLLC services. Processor 412 may store the multiple MCS tables in memory 414. Processor 422 may be configured to use the RRC parameter to indicate one of those MCS tables. For example, processor 412 may store or may be configured a first MCS table (e.g., "qam64" MCS table), a second MCS table (e.g., "qam256" MCS table) and a third MCS table (e.g., "qam64LowSE" MCS table). Processor 422 may use the RRC parameter such as, for example and without limitations, a ConfiguredGrantConfig IE, a PDSCH-Config IE, a PUSCH-Config IE, or a SPS-Config IE to indicate communication apparatus 410. The RRC parameter may carry L1 parameter such as, for example and without limitations, a mcs-Table or a mcs-TableTransformPrecoder to indicate the selected MCS table. Processor 422 may use the L1 parameter to indicate "qam64" for the first MCS table, "qam256" for the second MCS table and "qam64LowSE" for the third MCS table. The third MCS table may comprise fields with low code rate for used in performing high-reliability services (e.g., URLLC). Processor 412 may be configured to receive the RRC parameter from network apparatus 420. The RRC parameter may carry the L1 parameter indicating "qam64LowSE". Processor 412 may be able to determine that the selected MCS table is the third MCS table according to the RRC parameter. Processor 412 may be configured to use the third MCS table for a downlink channel (e.g., PDSCH) or an up link channel (e.g., PUSCH).

In some implementations, processor 422 may use a RNTI to indicate the selected MCS table. Specifically, processor 422 may use a specific RNTI for the URLLC services. The specific RNTI may comprise, for example and without limitations, a MCS-C-RNTI for indicating the use of "qam64LowSE" MCS table. Processor 422 may use the specific RNTI to scramble the CRC of the DCI for configuring the corresponding MCS table. Processor 412 may be configured to receive, via transceiver 416, the DCI in a control channel (e.g., PDCCH). When processor 412 receives the DCI scrambled with the specific RNTI, processor 412 may be configured to determine the selected MCS table according to the DCI. For example, processor 412 may determine that the selected MCS table is the third MCS table in a case that the DCI is scrambled with the MCS-C-RNTI. Accordingly, when the DCI format for scheduling is scrambled with the specific RNTI for URLLC, processor 412 may be able to implicitly recognize the associated service type of the scheduling DCI based on which RNTI can successfully decoded it.

In some implementations, in a case that the specific RNTI (e.g., MCS-C-RNTI) is not configured, processor 412 may use the RRC parameter field mcs-Table or mcs-TableTransformPrecoder to determine the MCS table. Accordingly, processor 422 may also use a mix of the RRC parameter and the RNTI to determine the MCS table. In a case that MCS-C-RNTI is not configured, processor 412 may use the higher-layer parameter mcs-Table or mcs-TableTransform-Precoder to determine the MCS table. In a case that MCS-C-RNTI is configured and the PDSCH is scheduled by a PDCCH with CRC scrambled by MCS-C-RNTI, processor 412 may be configured to use the third MCS table (e.g., "qam64LowSE" MCS table) for a downlink channel (e.g., PDSCH) or an up link channel (e.g., PUSCH).

In some implementations, processor 422 may use a type of search space to indicate the selected MCS table. Specifically, processor 412 may be configured with multiple search spaces for different PDCCH candidates. The types of the search space for PDCCH monitoring may comprise a common search and a UE-specific search space. In a case that the scheduling DCI for URLLC and eMBB are positioned in different search spaces, processor 412 may be able to identify the correct DCI for each corresponding service type according to the type of the search space. For example, in a case that the DCI formats 0_0/1_0 in the common search space are detected, processor 412 may determine that the first MCS table (e.g., "qam64" MCS table) is indicated. The first MCS table may be used in performing the eMBB service. In a case that the DCI formats 0_0/1_0/0_1/1_1 in the UE-specific search space are detected, processor 412 may determine that the third MCS table (e.g., "qam64LowSE" MCS table) is indicated. The third MCS table may be used in performing the URLLC service.

In some implementations, processor 412 may use a mix of the RRC parameter and the type of the search space to determine the MCS table. In a case that MCS-C-RNTI is not configured, when the higher-layer parameter mcs-Table or mcs-TableTransformPrecoder indicates the third MCS table (e.g., "qam64LowSE" MCS table), processor 412 may be configured to determine the MCS table based on whether the scheduling PDCCH is detected in the UE-specific search space or not. In a case that MCS-C-RNTI is configured, processor 412 may be configured to use the third MCS table (e.g., "qam64LowSE" MCS table) independently of the search space configuration.

In some implementations, processor 422 may use a DCI format to indicate the selected MCS table. Specifically, processor 422 may use a different or specific DCI format for the scheduling DCI for URLLC. Thus, the corresponding service type may be easily identified from the DCI by processor 412.

Illustrative Processes

Figure 5:
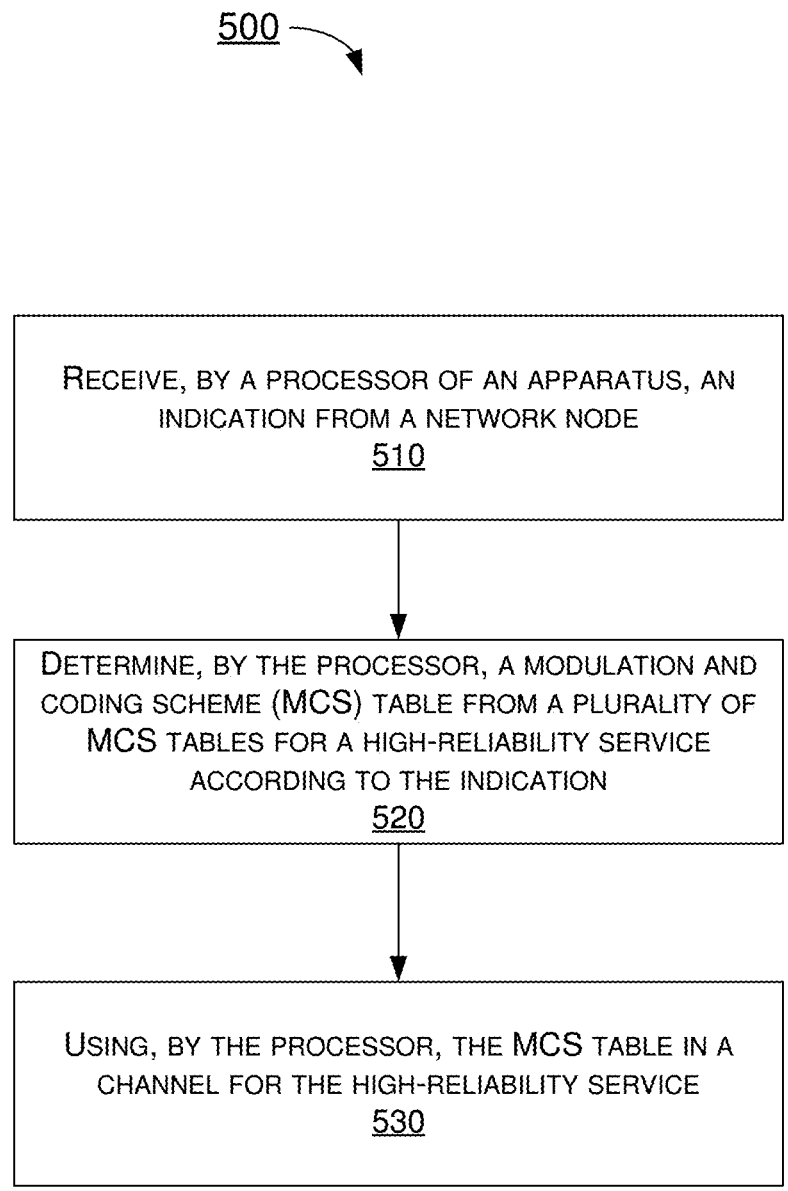
FIG. 5 is a flowchart of an example process in accordance with an implementation of the present disclosure.

FIG. 5 illustrates an example process 500 in accordance with an implementation of the present disclosure. Process 500 may be an example implementation of scenarios 200 and 300, whether partially or completely, with respect to MCS table determination in accordance with the present disclosure. Process 500 may represent an aspect of implementation of features of communication apparatus 410. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 receiving an indication from a network node. Process 500 may proceed from 510 to 520.

At 520, process 500 may involve processor 412 determining an MCS table from a plurality of MCS tables for a high-reliability service according to the indication. Process 500 may proceed from 520 to 530.

At 530, process 500 may involve processor 412 using the MCS table in a channel in performing the high-reliability service.

In some implementations, the indication may comprise a higher-layer parameter. The higher-layer parameter may comprise an RRC parameter.

In some implementations, the indication may comprise DCI scrambled with a specific RNTI.

In some implementations, the indication may comprise DCI positioned in a UE-specific search space.

In some implementations, process 500 may further involve processor 412 receiving DCI from the network node and determining an MCS index according to the DCI.

In some implementations, process 500 may further involve processor 412 determining MCS values according to the MCS table and the MCS index.

In some implementations, the high-reliability service may comprise a URLLC, an uplink grant-free service, or a downlink SPS service.

In some implementations, the channel may comprise a PDSCH, a CP-OFDM PUSCH, or a DFT-S-OFDM PUSCH.

In some implementations, process 500 may further involve processor 412 determining another MCS table from the plurality of MCS tables for an eMBB service according to the indication.

In some implementations, the indication may comprise DCI positioned in a common search space.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a signaling from a network node;
   configuring, by the processor based on the signaling, a plurality of modulation and coding scheme (MCS) tables corresponding to a plurality of services of different types associated with different reliability requirements;
   receiving, by the processor, an indication from the network node;

determining, by the processor, an MCS table from the plurality of MCS tables for a service of a specific type according to the indication; and using, by the processor, the MCS table in a channel in performing the service, wherein the indication comprises downlink control information (DCI) scrambled with a specific radio network temporary identifier (RNTI) corresponding to the determined MCS table, and wherein the determining of the MCS table from the plurality of MCS tables comprises decoding the scrambled DCI using the specific RNTI.

2. The method of claim 1, wherein the DCI is positioned in a user equipment (UE)-specific search space.

3. The method of claim 1, further comprising:
determining, by the processor, an MCS index according to the DCI.

4. The method of claim 3, further comprising:
determining, by the processor, MCS values according to the MCS table and the MCS index.

5. The method of claim 1, wherein the service of the specific type comprises a ultra-reliable and low-latency communication (URLLC), an uplink grant-free service, or a downlink semi-persistent scheduling (SPS) service.

6. The method of claim 1, wherein the channel comprises a physical downlink shared channel (PDSCH), a cyclic prefix-orthogonal frequency division multiplexing (CP-OFDM) physical uplink shared channel (PUSCH), or a discrete Fourier transform-spread OFDM (DFT-S-OFDM) PUSCH.

7. The method of claim 1, further comprising:
determining, by the processor, another MCS table from the plurality of MCS tables for an enhanced mobile broadband (eMBB) service according to the indication.

8. The method of claim 7, wherein the DCI is positioned in a common search space.

9. An apparatus, comprising:
a transceiver configured to wirelessly communicate with a network node of a wireless network; and
a processor communicatively coupled to the transceiver, the processor configured to perform operations comprising:
receiving, via the transceiver, a signaling from the network node;
configuring, based on the signaling, a plurality of modulation and coding scheme (MCS) tables corresponding to a plurality of services of different types associated with different reliability requirements;
receiving, via the transceiver, an indication from the network node;
determining a modulation and coding scheme (MCS) table from a plurality of MCS tables for a service of a specific type according to the indication; and
using the MCS table in a channel for the service,
wherein the indication comprises downlink control information (DCI) scrambled with a specific radio network temporary identifier (RNTI) corresponding to the determined MCS table, and
wherein, in determining the MCS table from the plurality of MCS tables, the processor decodes the scrambled DCI using the specific RNTI.

10. The apparatus of claim 9, wherein the DCI is positioned in a user equipment (UE)-specific search space.

11. The apparatus of claim 9, wherein the processor is further capable of:
determining, by the processor, a MCS index according to the DCI.

12. The apparatus of claim 11, wherein the processor is further capable of:
determining MCS values according to the MCS table and the MCS index.

13. The apparatus of claim 9, wherein the service of the specific type comprises a ultra-reliable and low-latency communication (URLLC), an uplink grant-free service, or a downlink semi-persistent scheduling (SPS) service.

14. The apparatus of claim 9, wherein the channel comprises a physical downlink shared channel (PDSCH), a cyclic prefix-orthogonal frequency division multiplexing (CP-OFDM) physical uplink shared channel (PUSCH), or a discrete Fourier transform-spread OFDM (DFT-S-OFDM) PUSCH.

15. The apparatus of claim 9, wherein the processor is further capable of:
determining another MCS table from the plurality of MCS tables for an enhanced mobile broadband (eMBB) service according to the indication.

16. The apparatus of claim 15, wherein the DCI is positioned in a common search space.

* * * * *